United States Patent [19]
Ott et al.

[11] Patent Number: 5,718,403
[45] Date of Patent: Feb. 17, 1998

[54] MOUNTING HARDWARE FOR A TOOLBAR

[75] Inventors: David Frederick Ott, Sherrard; Daniel Joseph Papish, Coal Valley, both of Ill.

[73] Assignee: Deere & Company, Moline, Ill.

[21] Appl. No.: 226,532

[22] Filed: Apr. 12, 1994

[51] Int. Cl.⁶ ............................................. F16L 3/08
[52] U.S. Cl. .................... 248/228.1; 248/219.4; 248/231.2
[58] Field of Search ............... 248/225.31, 219.4, 248/220.4, 316.1, 74.1, 71, 316.2, 231.2; 411/400, 429, 427, 401, 389, 424

[56] References Cited

U.S. PATENT DOCUMENTS

| 823,292 | 6/1906 | Robinson | 411/424 |
|---|---|---|---|
| 2,980,381 | 9/1961 | Dectrow et al. | 248/223 |
| 4,079,487 | 3/1978 | Coop, Sr. | 411/400 |
| 4,397,437 | 8/1983 | Madej | 248/72 |
| 4,729,532 | 3/1988 | Moss | 248/74.1 |
| 4,909,463 | 3/1990 | Zvanut et al. | 248/219.4 |
| 4,993,670 | 2/1991 | Tesar | 248/68.1 |
| 5,028,020 | 7/1991 | Sundholm | 248/74.4 |
| 5,215,281 | 6/1993 | Sherman | 248/74.1 |

FOREIGN PATENT DOCUMENTS

| 209808 | 1/1924 | United Kingdom. |
|---|---|---|
| WO95/17610 | 6/1995 | WIPO. |

*Primary Examiner*—Leslie A. Braun
*Assistant Examiner*—Anita M. King

[57] ABSTRACT

A mounting system for a toolbar comprises a mounting bolt having first and second legs that fit around a toolbar. The first and second legs have threaded portions that pass through first and second apertures in a mounting plate. A first mounting nut is screwed onto the threaded portion of the first leg. A second mounting nut having a conical portion is screwed onto the threaded portion of the second leg. The conical portion engages the circular edge of the second aperture and drives the second leg towards the first leg clamping the toolbar between the first and second legs.

14 Claims, 1 Drawing Sheet

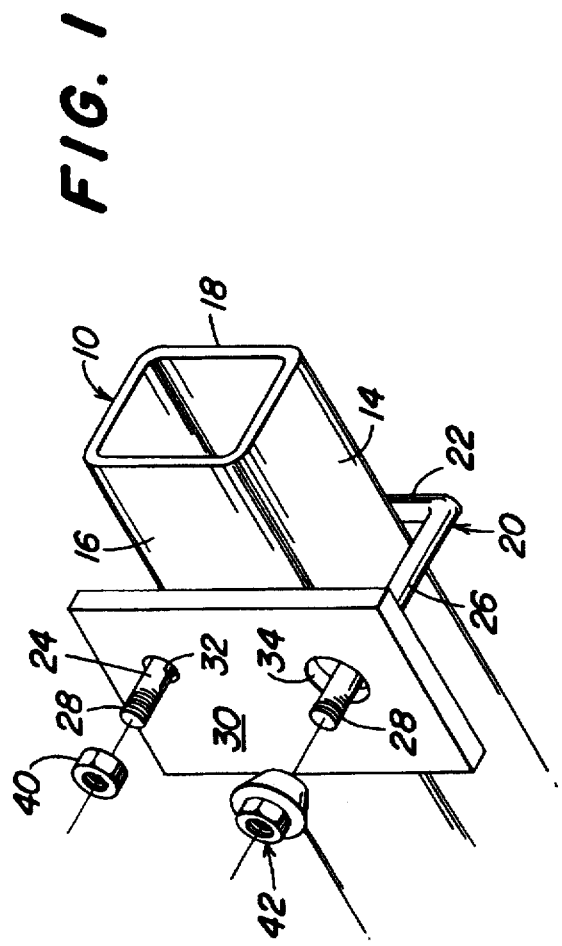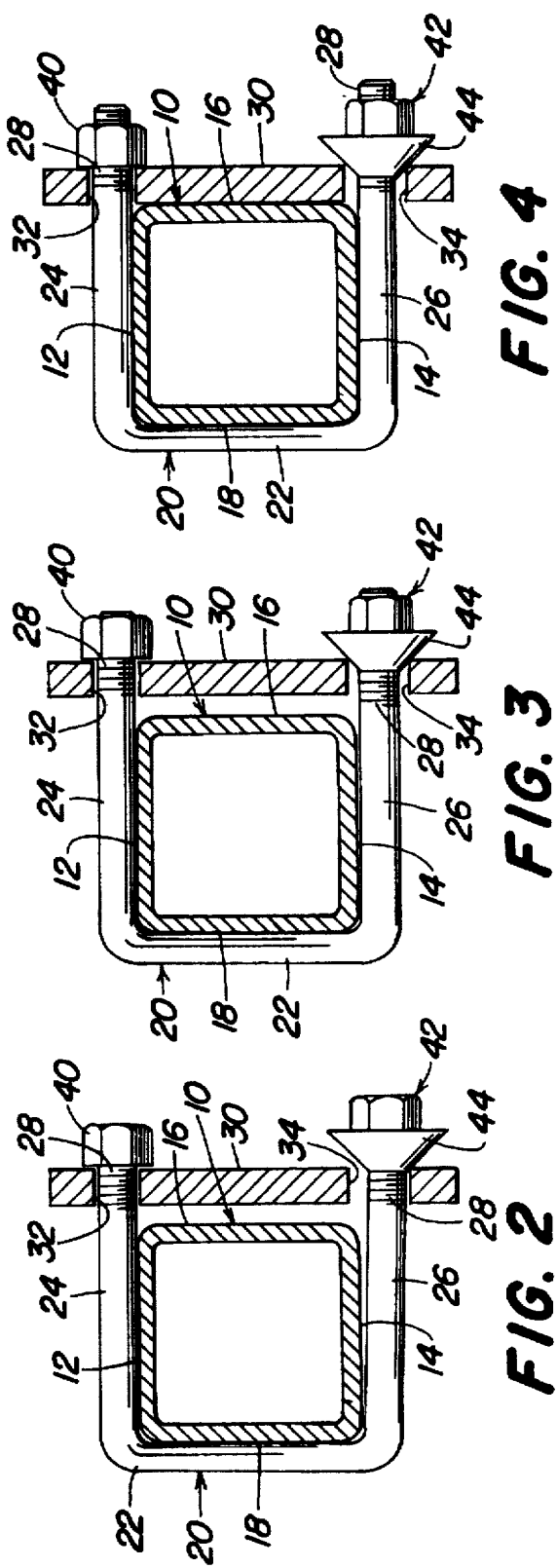

MOUNTING HARDWARE FOR A TOOLBAR

BACKGROUND OF THE INVENTION

1. Field of the Invention

The invention is directed to hardware for mounting an assembly on a toolbar.

2. Description of the Prior Art

Currently, U-bolts are used to hold various assemblies to toolbars. This is especially true with agricultural implements, such as row crop planters, where individual planting units are secured to the toolbar by U-bolts. Each U-bolt is provided with base from which extends two legs having threaded portions on their ends furthest from the base. These U-bolts are inserted around the toolbar where the threaded portions pass through apertures in a mounting plate. Nuts are then threaded onto the threaded portions and the toolbar is clamped between the mounting plate and the base of the U-bolt.

With a traditional U-bolt, as discussed above, the majority of the clamping force is exerted between the mounting plate and the base of the U-bolt. There is little if any clamping force exerted between the legs of the U-bolt.

To facilitate assembly the legs of the U-bolt are usually splayed apart a slight amount so they can more easily fit around the toolbar. Close tolerances must be met because if the legs are not splayed enough, the threaded portion of the legs may be damaged as the U-bolt is forced over the toolbar. In addition if the legs are too close together the paint on the toolbar may be damaged. If the legs are splayed to far apart, the legs may not line up with the mounting apertures in the mounting plate, making it difficult for the assembler.

SUMMARY

It is one of the objects of the present invention to provide a mounting system for a toolbar in which the clamping forces are exerted between the legs of the mounting bolts on a toolbar.

It is another object of the present invention to provide a mounting system for a toolbar in which the tolerances are not as critical as with previous mounting systems.

The mounting system of the present invention comprises a mounting bolt having at least two legs, a mounting plate having at least two apertures for receiving the legs of the mounting bolt, and two mounting nuts for threading onto the legs. The mounting bolt may be a conventional U-bolt having a base from which extends first and second legs having threaded portions on their ends. One aperture in the mounting plate is of conventional size for receiving the first leg of the mounting bolt, whereas the other aperture is enlarged for receiving the second leg. A conventional nut is threaded onto the threaded portion of the first leg. A nut, having a camming surface in the form of a conical portion, is threaded onto the threaded portion of the second leg. It should be noted, that in the preferred embodiment the conical portion is integral with the nut, however the conical portion can also be a separate part in the form of a conical washer.

In assembling the mounting system, the mounting bolt is first placed over the toolbar. The mounting plate is inserted onto the legs of the mounting bolt, so that the threaded portions extend through the apertures in the plate. The apertures in the plate are arranged so that the second leg is located off center in the second aperture away from the first leg. The nuts are then applied to the threaded portions of the legs. The camming surface pulls the second leg towards the center of the aperture, thereby applying a clamping force between the legs, in addition to the clamping force applied between the base of the mounting bolt and the mounting plate.

BRIEF DESCRIPTION OF THE DRAWINGS

FIG. 1 is a perspective view of the mounting system.

FIGS. 2–4 are side views of the mounting system being applied.

DETAILED DESCRIPTION

The mounting system of the present invention is designed to secure various assemblies to toolbars. Toolbar 10 is a rectangular bar of the type used with agricultural implements. Toolbar 10 is provided with first and second planar surfaces 12 and 14, respectively. The first and second planar surfaces, correspond to the top and bottom surfaces of the toolbar. Being a rectangular bar, toolbar 10 is also provided with third and fourth planar surfaces 16 and 18 respectively. The third and fourth planar surfaces, correspond to the front and back surfaces of the toolbar and are perpendicular to the first and second planar surfaces. Although this invention is described in conjunction with a rectangular toolbar, the toolbar can be of a variety of configurations.

Illustrated mounting bolt 20 is a conventional U-bolt having a base 22 and first and second outwardly extending legs 24 and 26, respectively. Each of the legs is provided with a threaded portion 28 located remote from the base 22. As illustrated in FIG. 2, the legs are splayed apart slightly to aid in assembling the mounting system. In addition, the length of the base 22 corresponds to the length of the third and fourth planar surfaces 16 and 18 of the toolbar 10. Although the mounting bolt of this invention is being described as a U-bolt, other mounting bolt configurations could be used.

Mounting plate 30 is provided with first and second circular apertures 32 and 34, respectively. First aperture 32 is of a conventional size for receiving first leg 24. Second aperture 34 is larger than the first aperture and receives the second leg 26 off-center in the aperture away from the first leg. The outer circumference of both apertures is defined by a circular edge formed in the mounting plate.

First mounting nut 40 is threaded onto the threaded portion 28 of the first leg 24. The second mounting nut 42 is threaded onto the threaded portion 28 of the second leg 26. The second mounting nut is provided with a camming surface comprising a conical portion 44 that may or may not be integral with the nut.

As the mounting nuts 40 and 42 are tightened on the threaded portions 28 of the first and second legs 24 and 26, the conical portion 44 engages the circular edge of the second aperture and drives the second leg 26 towards the first leg 24. By tightening the mounting nuts, the conical portion 44 centers the second leg in second aperture 34, thereby driving the first and second legs together and applying a clamping force between the legs.

The invention should not be limited by the above-described embodiments, but should be limited solely by the claims that follow.

We claim:

1. A mounting system comprising:

a toolbar having opposite sides;

a mounting bolt having first and second legs, both legs having threaded portions, the legs are located on opposite sides of the toolbar;

a mounting plate having first and second apertures, both apertures having edges, the first aperture receives the first leg and the second aperture receives the second leg;

first and second mounting nuts, the first mounting nut is screwed onto the threaded portion of the first leg, the second mounting nut is screwed onto the threaded portion of the second leg, the second mounting nut is provided with a camming surface which engages the edge of the second aperture for driving the first and second legs together for applying clamping force to the toolbar between the first and second legs as the mounting nuts are tightened.

2. A mounting system as defined by claim 1 wherein the camming surface is a conical portion and the edge of the second aperture is a circular edge.

3. A mounting system as defined by claim 2 wherein the conical portion is integral with the second mounting nut.

4. A mounting system as defined by claim 3 wherein the second aperture is bigger than the first aperture.

5. A mounting system as defined by claim 4 wherein the mounting bolt has a base that extends between the first and second legs.

6. A mounting system as defined by claim 5 wherein the mounting bolt is a U-bolt.

7. A mounting system as defined by claim 6 wherein second aperture has a center and the threaded portion of the second leg is located off-center in the second aperture and tightening the second mounting nut drives the second leg to the center of the second aperture.

8. A mounting system comprising:

a toolbar having opposite sides;

a mounting bolt having first and second legs, both legs having threaded portions, the legs are located on opposite sides of the toolbar;

a mounting plate having first and second circular apertures, both apertures are defined by a circular edge, the circular edge of the second aperture having a center, the first aperture receives the first leg and the second aperture receives the second leg, the second leg is located off-center in the second aperture;

first and second mounting nuts, the first mounting nut is screwed onto the threaded portion of the first leg, the second mounting nut is screwed onto the threaded portion of the second leg, the second nut is provided with a conical portion that engages the circular edge of the second aperture whereby when the second mounting nut is tightened the conical portion drives the second leg to the center of the second aperture driving the first and second legs together for applying clamping force to the toolbar between the first and second legs as the mounting nuts are tightened.

9. A mounting system as defined by claim 8 wherein the conical portion is integral with the second mounting nut.

10. A mounting system as defined by claim 9 wherein the second circular aperture is bigger than the first circular aperture.

11. A mounting system as defined by claim 10 wherein the mounting bolt has a base that extends between the first and second legs.

12. A mounting system comprising: a rectangular toolbar having a first and second planar surfaces that are parallel to one another, and third and fourth planar surfaces that are parallel to one another, the first and second planar surfaces are perpendicular to the third and fourth planar surfaces a U-bolt having a base and first and second extending legs, both legs having threaded portions remote from the base, the first leg is located adjacent to the first planar surface of the toolbar, the second leg is located adjacent to the second planar surface of the toolbar, the base is located adjacent to the fourth planar surface of the toolbar;

a mounting plate having first and second circular apertures, both apertures having circular edges, the first aperture receives the first leg and the second aperture receives the second leg whereby the mounting plate is adjacent to the third planar surface of the toolbar;

first and second mounting nuts, the first mounting nut is screwed onto the threaded portion of the first leg, the second mounting nut is screwed onto the threaded portion of the second leg, the second mounting nut is provided with a conical portion which engages the circular edge of the second aperture for driving the first and second legs together for applying clamping force to the toolbar between the first and second legs when the first and second mounting nuts are tightened, a clamping force is also applied between the mounting plate and the base of the U-bolt when the mounting nuts are tightened.

13. A mounting system as defined by claim 12 wherein the conical portion is integral with the second mounting nut.

14. A mounting system as defined by claim 13 wherein the second aperture is bigger than the first aperture.

\* \* \* \* \*